US007398522B2

(12) United States Patent
Komatsu et al.

(10) Patent No.: US 7,398,522 B2
(45) Date of Patent: Jul. 8, 2008

(54) COMPILATION AND RUNTIME INFORMATION GENERATION AND OPTIMIZATION

(75) Inventors: Hideaki Komatsu, Yokohama (JP); Toshio Suganuma, Yokohama (JP); Toshiaki Yasue, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 10/797,800

(22) Filed: Mar. 10, 2004

(65) Prior Publication Data

US 2004/0261067 A1  Dec. 23, 2004

(30) Foreign Application Priority Data

Mar. 12, 2003  (JP)  ............................. 2003-066010

(51) Int. Cl.
*G06F 9/45* (2006.01)
(52) U.S. Cl. .................................................... 717/151
(58) Field of Classification Search .................. None
See application file for complete search history.

(56) References Cited

U.S. PATENT DOCUMENTS

| 5,655,122 | A | * | 8/1997 | Wu ............................. 717/152 |
| 5,889,999 | A | * | 3/1999 | Breternitz et al. ........... 717/158 |
| 6,088,525 | A | * | 7/2000 | Peri ............................ 717/150 |
| 6,341,371 | B1 | * | 1/2002 | Tandri ........................ 717/158 |
| 2003/0204840 | A1 | * | 10/2003 | Wu ............................ 717/158 |

FOREIGN PATENT DOCUMENTS

| JP | 05-128748 | 5/1993 |
| JP | 05-258543 | 10/1993 |
| JP | 06-215307 | 8/1994 |

OTHER PUBLICATIONS

Thomas Ball, James R. Larus "Optimally Profiling Tracing Programs".*
Ball, Thomas and James R. Larus. "Efficient Path Profiling," Proceedings of the 29th International Conference on Microarchitecture, Dec. 1996.

* cited by examiner

*Primary Examiner*—Wei Zhen
*Assistant Examiner*—Phillip H Nguyen
(74) *Attorney, Agent, or Firm*—Scully, Scott, Murphy & Presser, P.C.; Lisa M. Yamonaco, Esq.

(57) ABSTRACT

To collect frequencies with which processes of a program are executed at high speed. A compiler apparatus for optimizing a program based on frequencies with which each process is executed has a loop process detection portion for detecting a repeatedly executed loop process of the program, a loop process frequency collection portion for collecting loop process frequencies with which the loop process is executed in the program, an in-loop process frequency collection portion for collecting in-loop process frequencies with which, as against times of execution of loop process, each of a plurality of in-loop processes included in the loop process is executed, an in-loop execution information generating portion for generating in-loop execution information indicating the frequencies with which each of the plurality of in-loop processes is executed in the case where the program is executed, and an optimization portion for optimizing the program based on the in-loop execution information.

2 Claims, 14 Drawing Sheets

[Figure 1]
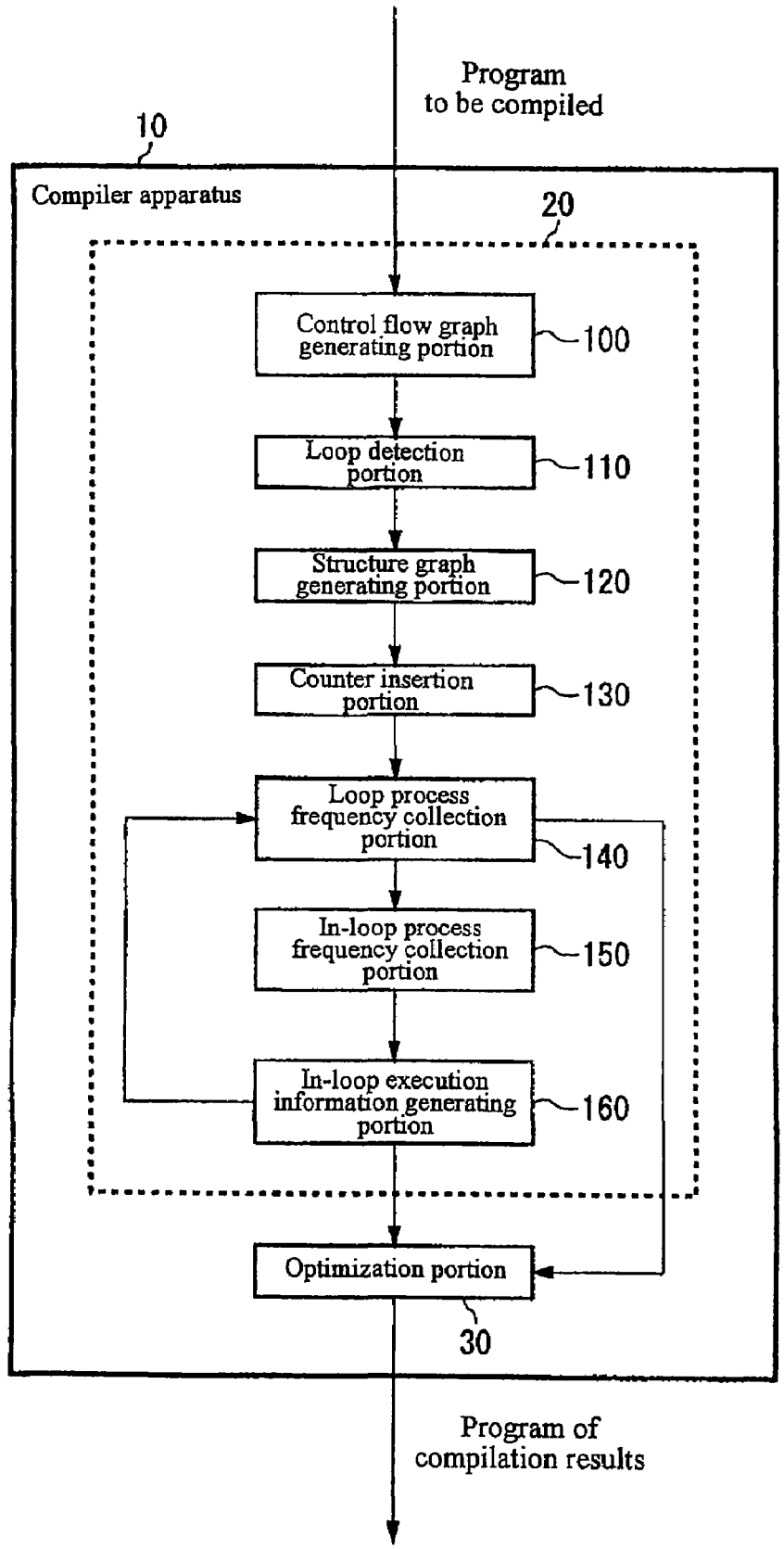

[Figure 2]
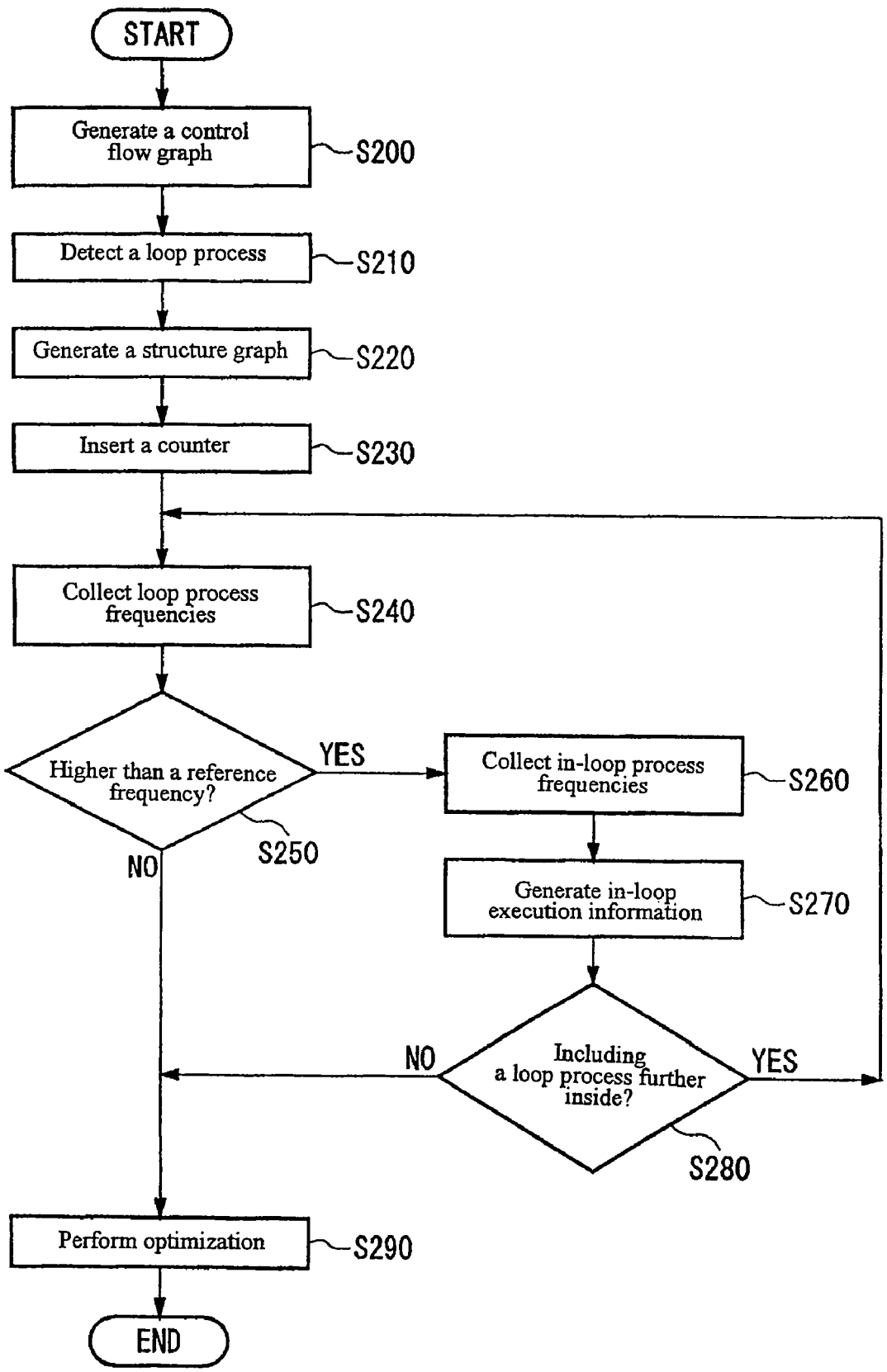

[Figure 3]

```
1:   public void m()
2:   {
3:      ...                    ············ First basic block
4:      do {
5:         ...                 ············ Second basic block
6:         while (...) {       ······ Third basic block
7:            ...          ⎫
8:            if (...)     ⎬   ······ Fourth basic block
9:               return;       ······ Fifth basic block
10:        }
11:        ...           ⎫
12:     } while (...)    ⎭    ······ Sixth basic block
13:     ...                    ······ Seventh basic block
14:  }
```

[Figure 4]
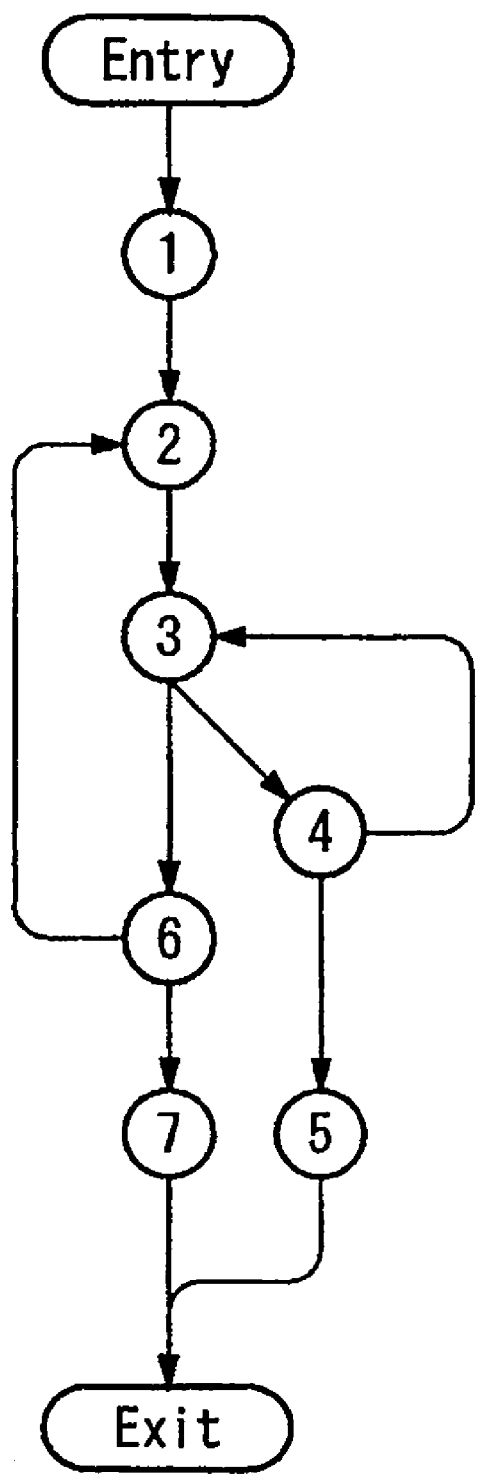

[Figure 5]
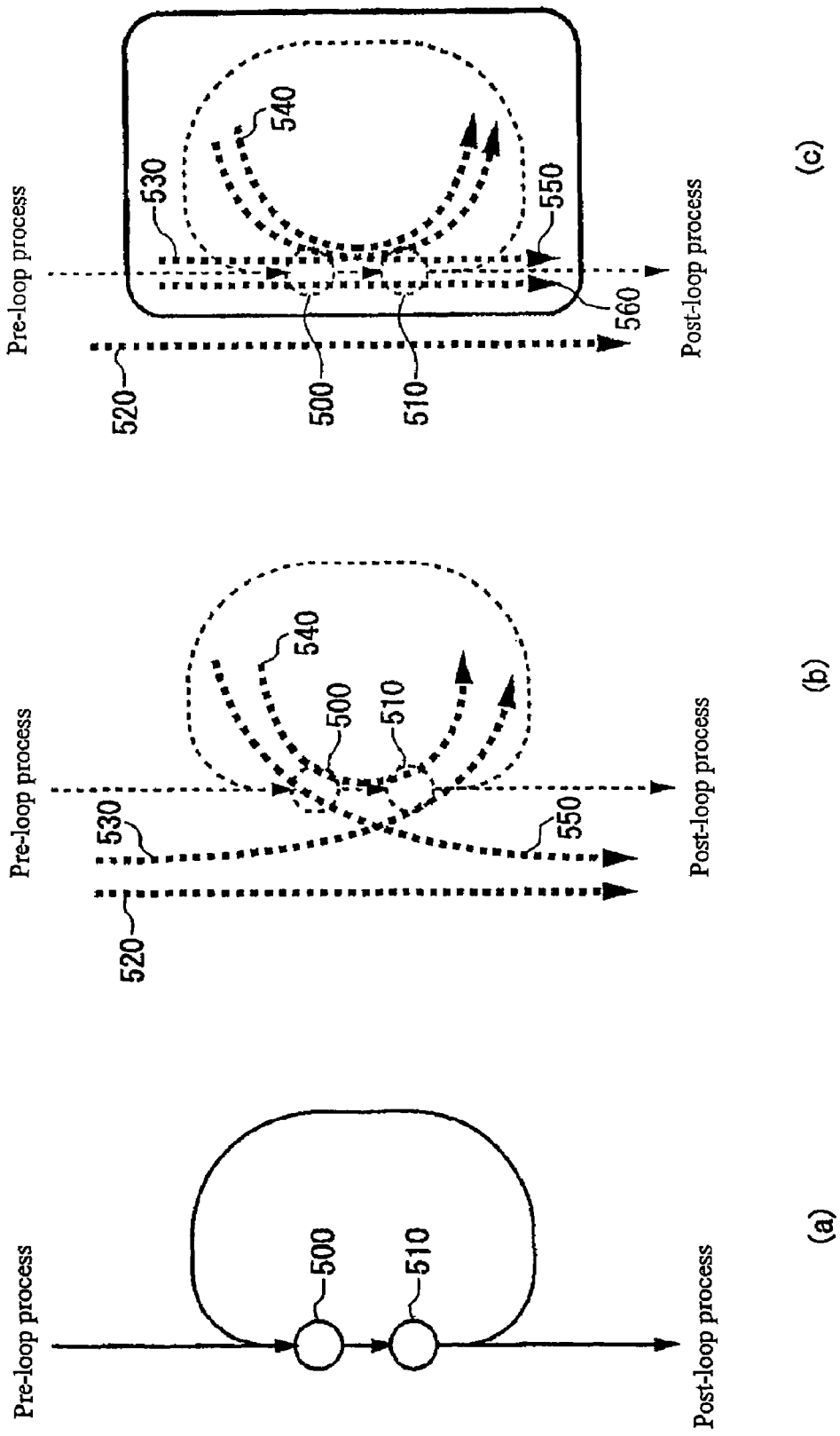

[Figure 6]
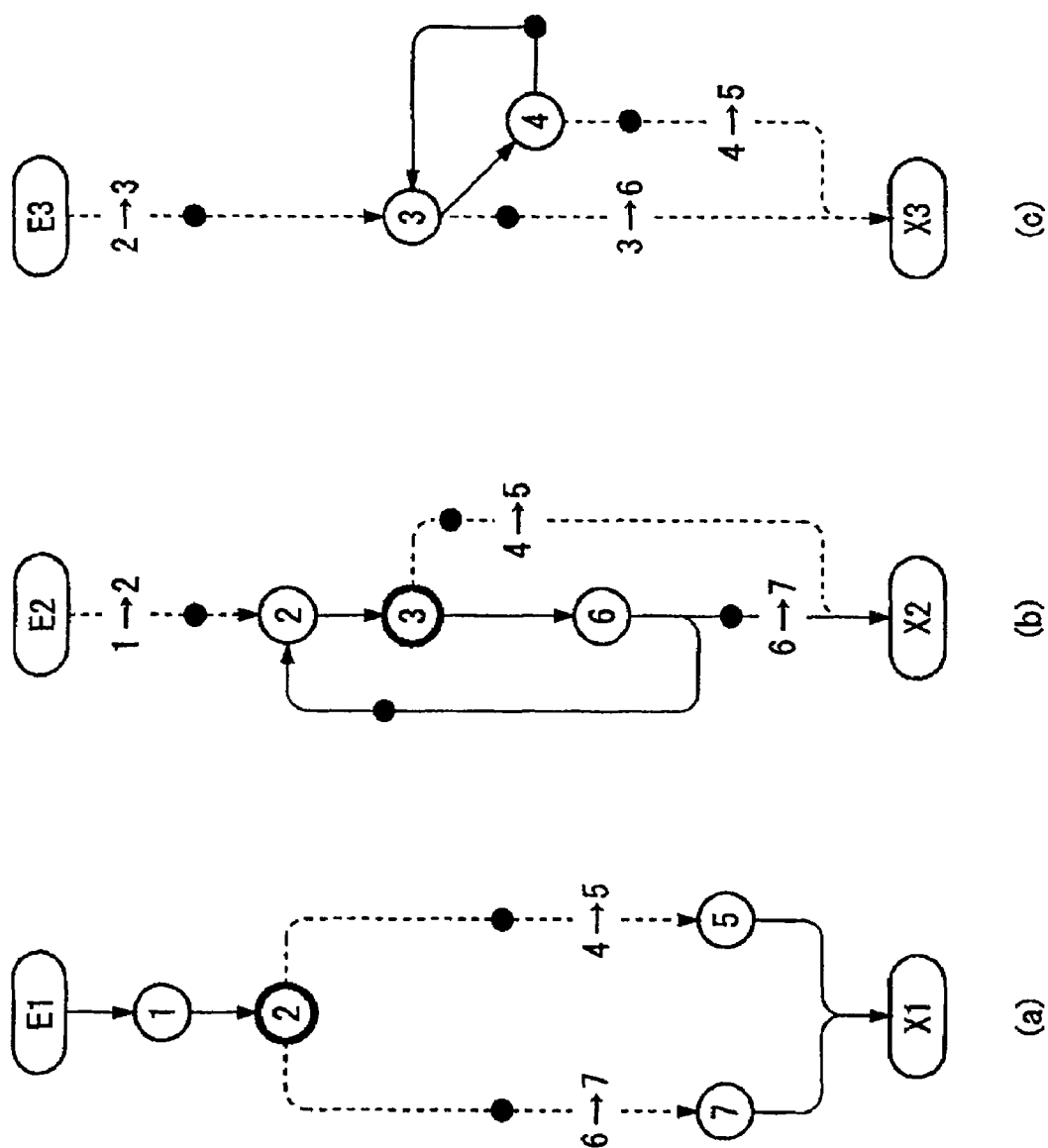

[Figure 7]
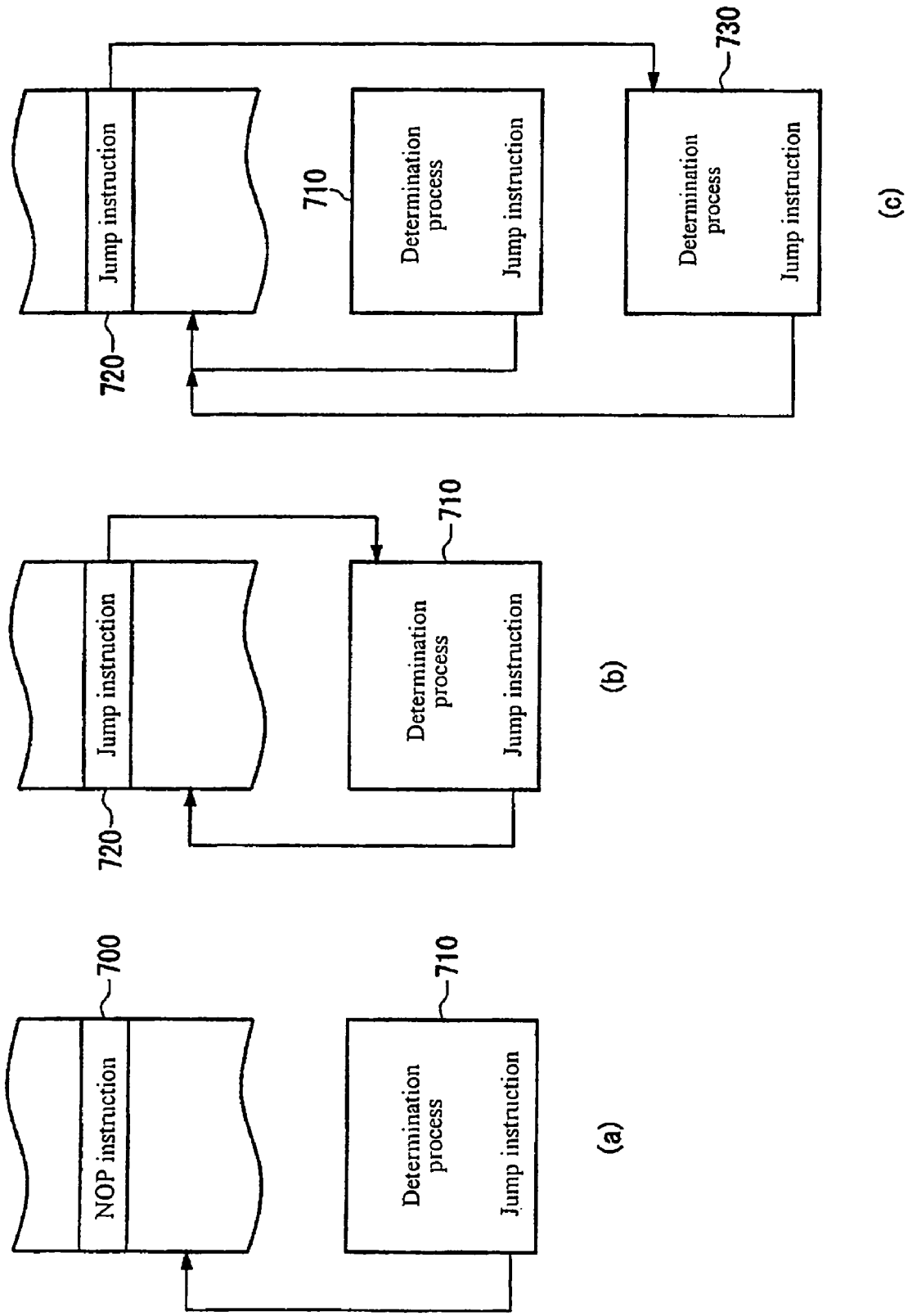

[Figure 8]

| Structure graph | Execution path of the structure graph | | Determined value | Execution information | Number of times of actual execution |
|---|---|---|---|---|---|
| | Identification information | Execution path | | | |
| Outline structure graph | 1 | E1-1-2-7-X1 | 100 | 100.0 | 10000 |
| | 2 | E1-1-2-5-X1 | 0 | 0.0 | 0 |
| In-outer loop structure graph | 3 | E2-2-3-X2 | 0 | 0.0 | 0 |
| | 4 | E2-2-3-6-X2 | 50 | 98.0 | 9800 |
| | 5 | E2-2-3-6-(2) | 1 | 2.0 | 200 |
| | 6 | (6)-2-3-X2 | 0 | 0.0 | 0 |
| | 7 | (6)-2-3-6-X2 | 1 | 2.0 | 200 |
| | 8 | (6)-2-3-6-(2) | 48 | 94.1 | 9600 |
| In-inner loop structure graph | 9 | E3-3-4-X3 | 0 | 0.0 | 0 |
| | 10 | E3-3-4-(3) | 2 | 6.8 | 683 |
| | 11 | E3-3-X3 | 56 | 189.3 | 19117 |
| | 12 | (4)-3-4-X3 | 0 | 0.0 | 0 |
| | 13 | (4)-3-4-(3) | 40 | 135.2 | 13660 |
| | 14 | (4)-3-X3 | 2 | 6.8 | 683 |
| Total | | | 300 | 634.1 | 63943 |

[Figure 9]
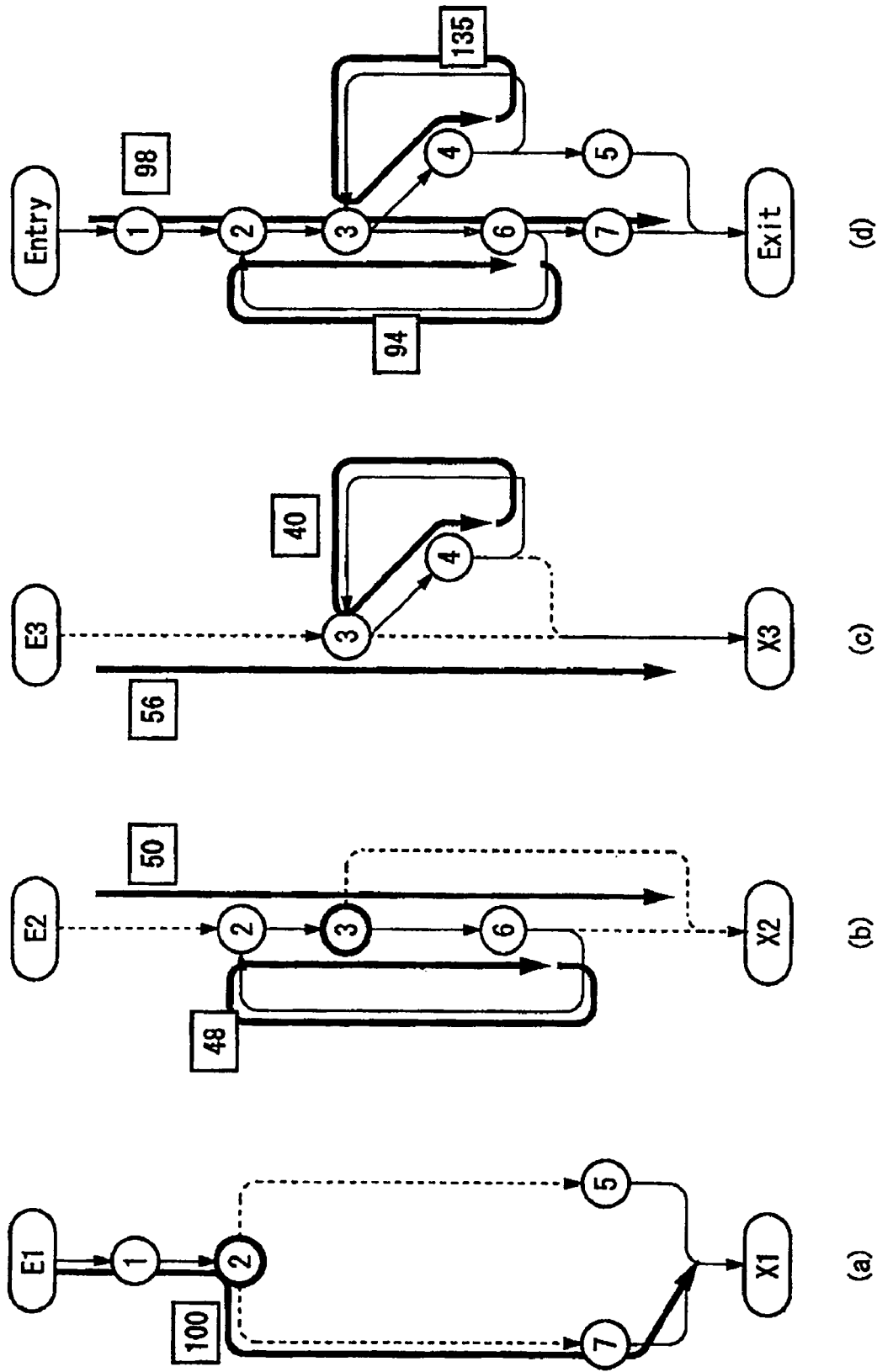

[Figure 10]
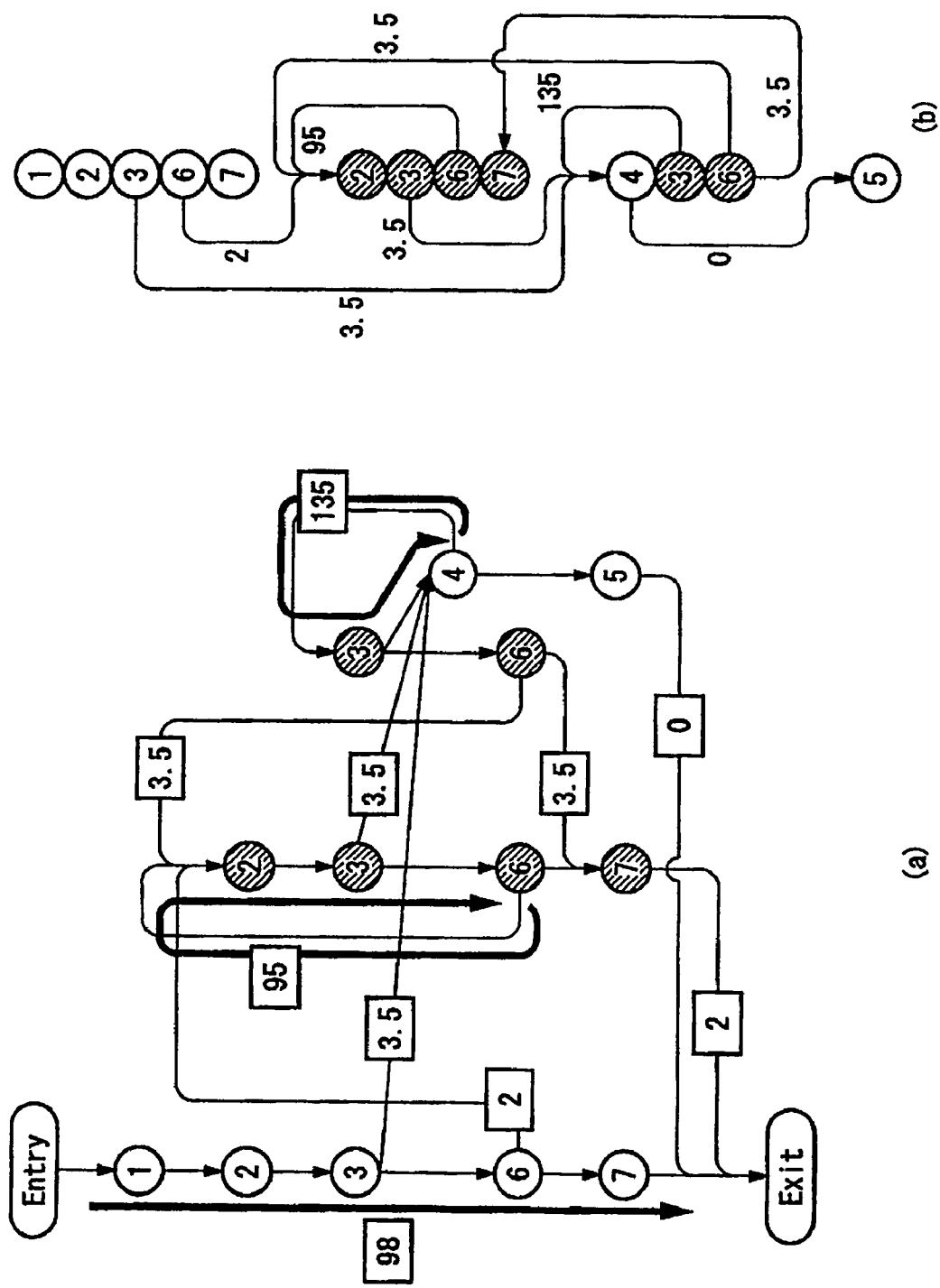

[Figure 11]
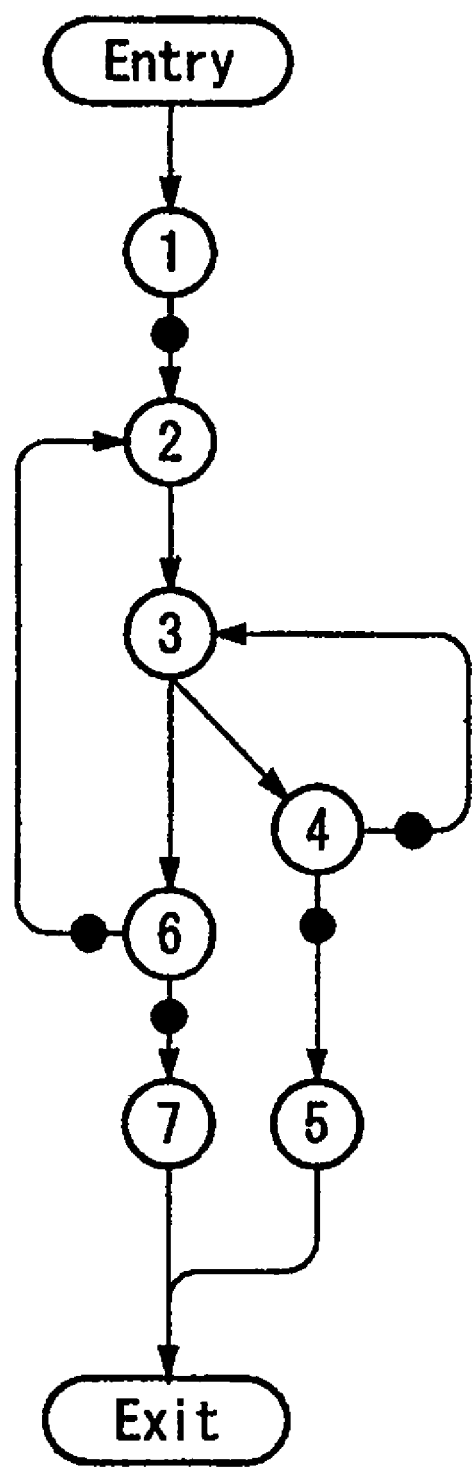

[Figure 12]
| ID No. | Execution path | Determined value | Number of times of execution |
|---|---|---|---|
| 1 | Entry-1-2-3-4-5-Exit | 0 | 0 |
| 2 | Entry-1-2-3-4-(3) | 5 | 345 |
| 3 | Entry-1-2-3-6-7-Exit | 124 | 9462 |
| 4 | Entry-1-2-3-6-(2) | 0 | 193 |
| 5 | (4)-3-4-5-Exit | 0 | 0 |
| 6 | (4)-3-4-(3) | 167 | 13660 |
| 7 | (4)-3-6-7-Exit | 4 | 345 |
| 8 | (4)-3-6-(2) | 0 | 338 |
| 9 | (6)-2-3-4-5-Exit | 0 | 0 |
| 10 | (6)-2-3-4-(3) | 0 | 338 |
| 11 | (6)-2-3-6-7-Exit | 0 | 193 |
| 12 | (6)-2-3-6-(2) | 0 | 9269 |
| | Total | 300 | 34143 |
(b)
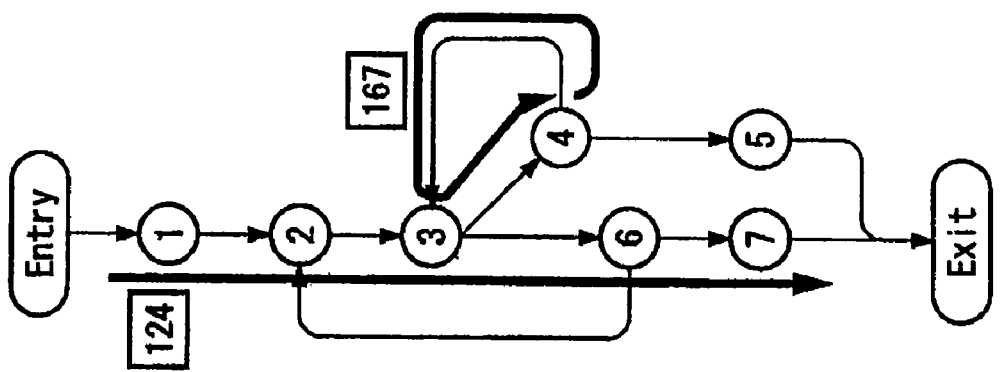
(a)

[Figure 13]
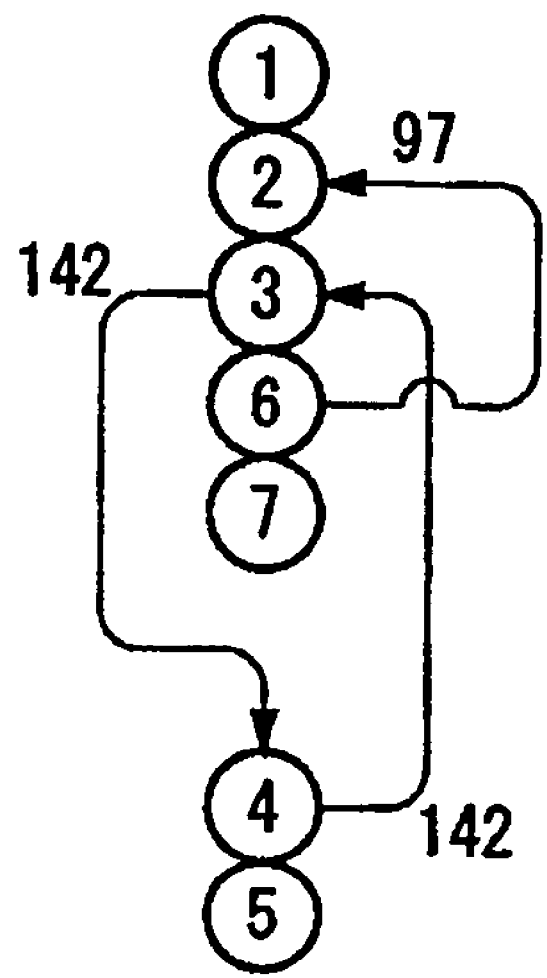

[Figure 14]
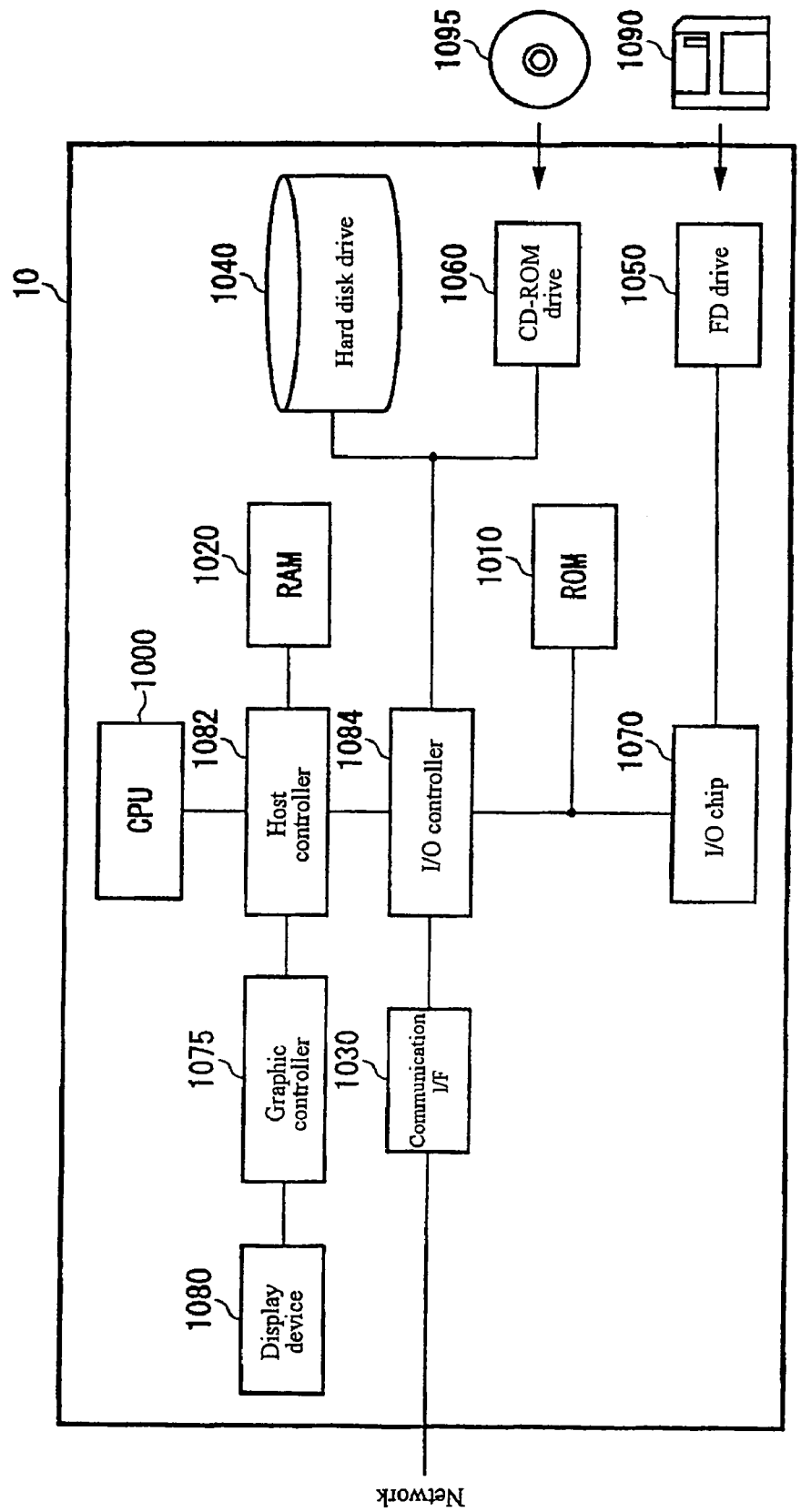

ated by the compiler apparatus 10;

COMPILATION AND RUNTIME INFORMATION GENERATION AND OPTIMIZATION

FIELD OF INVENTION

The present invention relates to a compiler apparatus, program, record medium, and method, and to runtime information generating apparatus and program. More particularly, the present invention relates to the compiler apparatus, compiler program, record medium, compilation method, runtime information generating apparatus and runtime information generating program for performing optimization by using execution information obtained when a program is executed.

BACKGROUND OF THE INVENTION

In the past, a technology for collecting the number of times of execution of each of a plurality of execution paths of a program was used. For instance, according to the technology described in the Non-Patent Document 1, a compiler can insert a counter at an appropriate position in order to count the number of times of execution of the plurality of execution paths.

Non-Patent Document 1

"Efficient Path Profiling," Proceedings of 29th International Conference on Microarchitecture (MICRO-29), Ball, T and Larus, J. R., pp. 46 to 57, December 1996

Problems to be Solved by the Invention

However, the above technology requires a long time to process a collection even though it can adequately collect the number of times of execution of each execution path.

SUMMARY OF THE INVENTION

Thus, an object of the present invention is to provide the compiler apparatus, compiler program, record medium, compilation method, runtime information generating apparatus and runtime information generating program capable of solving the problem. This object is achieved by combining the characteristics described in independent sections of articles in the description. The subordinate sections prescribe further advantageous embodiments of the present invention.

To be more specific, a first form of the present invention provides a compiler apparatus, a compilation method, a compiler program, a runtime information generating apparatus, a runtime information generating program and a record medium for collecting frequencies with which each process is executed in a program to be optimized and optimizing the program based on the collected frequencies, having a loop process detection portion for detecting a repeatedly executed loop process of the program, a loop process frequency collection portion for collecting loop process frequencies with which the loop process is executed in the program, an in-loop process frequency collection portion for collecting in-loop process frequencies with which, as against the number of times of execution of the loop process, each of a plurality of in-loop processes included in the loop process is executed, an in-loop execution information generating portion for, based on the loop process frequencies and the in-loop process frequencies, generating in-loop execution information indicating the frequencies with which each of the plurality of in-loop processes is executed in the case where the program is executed, and an optimization portion for optimizing the program based on the in-loop execution information generated by the in-loop execution information generating portion.

The above overview of the invention does not list all the necessary characteristics of the present invention, and subcombinations of the characteristic group may also be inventions.

BRIEF DESCRIPTION OF THE DRAWINGS

The invention and its embodiments will be more fully appreciated by reference to the following detailed description of advantageous and illustrative embodiments in accordance with the present invention when taken in conjunction with the accompanying drawings, in which:

FIG. 1 shows a functional block diagram of a compiler apparatus 10;

FIG. 2 shows a flowchart of the compiler apparatus 10;

FIG. 3 shows an example of a program to be optimized;

FIG. 4 shows an example of a control flow graph;

FIG. 5(a) shows an example of the control flow graph for which structure graphs will be generated;

FIG. 5(b) shows execution paths of the control flow graph;

FIG. 5(c) shows the execution paths of the structure graph generated from the control flow graph;

FIG. 6(a) shows an example of an outline structure graph generated from the control flow graph shown in FIG. 4;

FIG. 6(b) shows an example of an in-outer loop structure graph generated from the control flow graph shown in FIG. 4;

FIG. 6(c) shows an example of an in-inner loop structure graph generated from the control flow graph shown in FIG. 4;

FIG. 7(a) shows an example wherein a counter inserted into the program is stopped;

FIG. 7(b) shows an example wherein the counter inserted into the program is started;

FIG. 7(c) shows an example of generating a plurality of counters at the same insertion position;

FIG. 8 shows an example of execution information generated by the compiler apparatus 10;

FIG. 9(a) shows the number of times of execution of each execution path determined by the outline structure graph;

FIG. 9(b) shows the number of times of execution of each execution path determined by the in-outer loop structure graph;

FIG. 9(c) shows the number of times of execution of each execution path determined by the in-inner loop structure graph;

FIG. 9(d) shows an example of in-loop execution information generated by an in-loop execution information generating portion 160;

FIG. 10(a) shows an example wherein the program is optimized by an optimization portion 30;

FIG. 10(b) shows the results wherein instruction sequences are placed in the program optimized by the optimization portion 30;

FIG. 11 shows an example of the execution information in a first other example;

FIG. 12(a) shows an example of the execution information collected in the first other example on the control flow graph;

FIG. 12(b) shows an example of the execution information collected in the first other example in a table;

FIG. 13 shows an example of the program optimized in a second other example; and FIG. 14 shows an example of hardware configuration of the compiler apparatus 10 according to the embodiment described above.

DESCRIPTION OF SYMBOLS

10 . . . Compiler apparatus
20 . . . Runtime information generating apparatus
30 . . . Optimization portion
100 . . . Control flow graph generating portion
110 . . . Loop detection portion
120 . . . Structure graph generating portion
130 . . . Counter insertion portion
140 . . . Loop process frequency collection portion
150 . . . In-loop process frequency collection portion
160 . . . In-loop execution information generating portion
500 . . . Header node
510 . . . Latch node
520 . . . Execution path
530 . . . Execution path
540 . . . Execution path
550 . . . Execution path
560 . . . Execution path
700 . . . NOP instruction
710 . . . Determination process
720 . . . Jump instruction
730 . . . Determination process

DETAILED DESCRIPTION OF THE INVENTION

The present invention provides methods, systems and apparatus for compiler apparatus, compiler program, record medium, compilation method, runtime information generating apparatus and runtime information generating program capable of solving the problem of requiring a long time to process a collection even though it can adequately collect the number of times of execution of each execution path.

An example embodiment of the present invention provides a compiler apparatus, a compilation method, a compiler program, a runtime information generating apparatus, a runtime information generating program and a record medium for collecting frequencies with which each process is executed in a program to be optimized and optimizing the program based on the collected frequencies, having a loop process detection portion for detecting a repeatedly executed loop process of the program, a loop process frequency collection portion for collecting loop process frequencies with which the loop process is executed in the program, an in-loop process frequency collection portion for collecting in-loop process frequencies with which, as against the number of times of execution of the loop process, each of a plurality of in-loop processes included in the loop process is executed, an in-loop execution information generating portion for, based on the loop process frequencies and the in-loop process frequencies, generating in-loop execution information indicating the frequencies with which each of the plurality of in-loop processes is executed in the case where the program is executed, and an optimization portion for optimizing the program based on the in-loop execution information generated by the in-loop execution information generating portion.

Preferred Embodiment

Hereafter, the present invention will be described through an embodiment. However, the following embodiment does not limit the invention according to the claims, and all the combinations described in the embodiment are not always essential to the means for solving the problem of the invention.

FIG. 1 shows a functional block diagram of a compiler apparatus 10. The compiler apparatus 10 has a runtime information generating apparatus 20 for collecting frequencies with which each process is executed in a program to be optimized and an optimization portion 30 for optimizing the program based on the frequencies collected by the runtime information generating apparatus 20. The runtime information generating apparatus 20 has a control flow graph generating portion 100, a loop detection portion 110, a structure graph generating portion 120, a counter insertion portion 130, a loop process frequency collection portion 140, an in-loop process frequency collection portion 150 and an in-loop execution information generating portion 160, and has the program optimized by the optimization portion 30 based on in-loop execution information generated by the in-loop execution information generating portion 160.

On receiving the program to be compiled, the control flow graph generating portion 100 generates each of a plurality of instruction sequences in the program as a node, and generates a control flow graph in which the execution order of the plurality of instruction sequences is generated as a directed edge of the nodes. And the control flow graph generating portion 100 sends the control flow graph to the loop detection portion 110 together with the program.

The program to be compiled is an intermediate expression generated from a source program for the sake of efficient optimization, which is a byte code of Java⁰ for instance. Instead, the program may be either RTL (Registered Transfer Language) or a quadruplet expression.

The instruction sequence is a set of instructions to be consecutively executed. As an example, the instruction sequence is a basic block which is the set of instructions, wherein the instructions other than the instruction to be executed first and the instruction to be executed last are neither branching sources nor branching destinations of a branch instruction. As another example, the instruction sequence may be a super block which is the set of instructions, wherein the instructions other than the instruction to be executed first and the instruction to be executed last are not the branching destinations of the branch instruction On receiving the control flow graph and the program from the control flow graph generating portion 100, the loop detection portion 110 detects a repeatedly executed loop process of the program. In the case where the detected loop process includes an inner loop process which is a further inside loop process, the loop detection portion 110 further detects the inner loop process. And the loop detection portion 110 sends information on the detected loop process to the structure graph generating portion 120 together with the control flow graph and the program. The loop process is the set of instructions corresponding to strongly connected components which are a set of mutually reachable nodes in the control flow graph.

The structure graph generating portion 120 generates an outline structure graph in which an outer loop node is generated as a single node for showing an outer loop process in its entirety in the control flow graph instead of a collection of the nodes forming the outer loop process. The structure graph generating portion 120 also generates an in-outer loop structure graph in which an inner loop node is generated as a single node for showing an inner loop process in its entirety in the control flow graph of the outer loop process instead of a collection of the nodes forming the inner loop process. Furthermore, the structure graph generating portion 120 generates an in-inner loop structure graph which is the control flow graph of the inner loop process. And the structure graph generating portion 120 sends the outline structure graph, in-outer loop structure graph, in-inner loop structure graph and program to the counter insertion portion 130.

The counter insertion portion 130 inserts the counter into the program in order to count the number of times of execution of each execution path in each of the outline structure graph, in-outer loop structure graph and in-inner loop structure graph. And the counter insertion portion 130 sends the program having the counter inserted therein to the loop process frequency collection portion 140 together with the outline structure graph, in-outer loop structure graph and in-inner loop structure graph.

The loop process frequency collection portion 140 receives the outline structure graph, in-outer loop structure graph and in-inner loop structure graph from the counter insertion portion 130. In the case of receiving the program having the counter inserted therein from the counter insertion portion 130, the loop process frequency collection portion 140 starts the inserted counter and executes the received program in order to count the number of times of execution of each execution path in the outline structure graph. Thereafter, the loop process frequency collection portion 140 stops the started counter when the program is executed a predetermined number of times. And the loop process frequency collection portion 140 collects the number of times of execution of the outer loop process determined by the counter on stopping as outer loop process frequencies with which the outer loop process is executed, and sends the collection results to the in-loop process frequency collection portion 150 together with the program. The loop process frequency collection portion 140 sends to the optimization portion 30, together with the program, outline structure graph frequency information indicating the frequency with which, as against the numbers of times of execution of the program, each execution path in the outline structure graph is executed.

Preferably, the loop process frequency collection portion 140 detects a more frequently executed program piece by using an apparatus such as a timer sampling profiler for determining an execution frequency of the program, and starts the counter just for the outline structure graph of the program piece. Here, the program piece is a method, a function or a procedure for instance. In this case, it is possible to optimize the more frequently executed program piece in preference so that processing speed of the program can be improved and the compiler apparatus 10 can be operated at high speed.

In the case of receiving the in-loop execution information on the outer loop process from the in-loop execution information generating portion 160, the loop process frequency collection portion 140 collects the loop process frequencies of the inner loop process based on the in-loop execution information and sends the collection results to the in-loop process frequency collection portion 150.

On receiving the collection results of the outer loop process frequencies from the loop process frequency collection portion 140, the in-loop process frequency collection portion 150 determines whether or not the process frequencies of the outer loop process are higher than a predetermined reference frequency. In the case where the process frequencies of the outer loop process are higher than the predetermined reference frequency, the in-loop process frequency collection portion 150 starts the inserted counter in order to count the number of times of execution of each execution path in the in-outer loop structure graph, and thereby determines the number of times of execution of each of a plurality of in-loop processes in the outer loop process. Thereafter, the in-loop process frequency collection portion 150 stops the started counter when a total of determined values of the plurality of in-loop processes becomes a predetermined number of times. And the in-loop process frequency collection portion 150 collects as in-outer loop process frequencies the number of times of execution of each in-outer loop process as against the numbers of times for the in-outer loop processes to be executed based on the determined values of the stopped counter, and sends the collection results to the in-loop execution information generating portion 160.

A description will be omitted as to the process in the case where the in-loop process frequency collection portion 150 receives the collection results of the inner loop process frequencies from the loop process frequency collection portion 140 because it is approximately the same as the process performed for the outer loop process by the in-loop process frequency collection portion 150.

Here, the in-loop process is the set of instructions on the execution path of the structure graph, for instance. Instead, the in-loop process may be either the instruction sequence indicated by each node of the structure graph or the branch instruction in the structure graph. To be more specific, the in-loop process frequency collection portion 150 generates a plurality of instruction groups from the instructions in the program by a predetermined method, and determines the number of times of execution of each instruction group as the number of times of execution of each in-loop process.

In the case of receiving the outer loop process frequencies and in-outer loop process frequencies, the in-loop execution information generating portion 160 generates the in-loop execution information for indicating the frequency with which each of the plurality of in-outer loop processes is executed in the case where the program is executed, and sends it to the loop process frequency collection portion 140 and optimization portion 30. In the case of receiving the inner loop process frequencies and in-inner loop process frequencies, the in-loop execution information generating portion 160 generates the in-loop execution information for indicating the frequency with which each of the plurality of inner loop processes is executed in the case where the program is executed, and sends it to the optimization portion 30.

In the case where there is an inner loop process further inside the inner loop process, the in-loop execution information generating portion 160 may send the in-loop execution information on the inner loop process to the loop process frequency collection portion 140. In this case, the loop process frequency collection portion 140 and the in-loop process frequency collection portion 150 repeat approximately the same operation as to the loop process further inside the inner loop process.

The optimization portion 30 optimizes the program received from the loop process frequency collection portion 140 based on the in-loop execution information and outline structure graph frequency information. Instead, the optimization portion 30 may optimize the program before having the counter inserted by the counter insertion portion 130. And the optimization portion 30 outputs the optimized program as the program of the compilation results.

FIG. 2 shows a flowchart of the compiler apparatus 10. On receiving the program to be compiled, the control flow graph generating portion 100 generates the control flow graph of the program (S200). And the loop detection portion 110 detects the repeatedly executed loop process of the program (S210). In the case where the detected loop process includes the inner loop process which is a further inside loop process, the loop detection portion 110 further detects the inner loop process. The structure graph generating portion 120 generates the outline structure graph in which the outer loop node is generated as the single node for showing the outer loop process in its entirety in the control flow graph instead of the collection of the nodes forming the outer loop process (S220). The structure graph generating portion 120 also generates an in-outer loop structure graph in which the inner loop node is generated as the single node for showing the inner loop process in its entirety in the control flow graph of the outer loop process instead of the collection of the nodes forming the inner loop process. Furthermore, the structure graph generating portion 120 generates an in-inner loop structure graph which is the control flow graph of the inner loop process.

The counter insertion portion 130 inserts the counter into the program in order to count the number of times of execution of each execution path in each of the outline structure graph, in-outer loop structure graph and in-inner loop structure graph (S230). And the loop process frequency collection portion 140 generates the process frequencies of the loop process, for example, the outer loop process frequencies for instance by executing the program (S240). The loop process frequency collection portion 140 generates the inner loop process frequencies based on the in-loop process frequencies of the outer loop process. In the case where the process frequencies of the loop process are higher than the predetermined frequencies (S250, YES), the in-loop process frequency collection portion 150 collects the in-loop process frequencies with which, as against the number of times of execution of the loop process, each of the plurality of in-loop processes in the loop process is executed (S260). The in-loop execution information generating portion 160 generates the in-loop execution information based on the loop process frequencies and the in-loop process frequencies (S270). In the case where the loop process includes the loop process further inside (S280, YES), the in-loop execution information generating portion 160 shifts the process to S240 in order to collect the process frequencies of the inner loop process.

In the case where the process frequencies of the loop process are lower than the predetermined frequencies (S250, NO), or in the case where the loop process includes no loop process further inside (S280, NO), the optimization portion 30 optimizes the program based on the in-loop execution information, and outputs it as the program of the compilation results (S290).

The timing for the in-loop process frequency collection portion 150 to collect the in-loop process frequencies is not limited to the timing in this flowchart. For instance, the in-loop process frequency collection portion 150 may start collecting the in-loop process frequencies as to each of the in-outer loop structure graph and in-inner loop structure graph when the loop process frequency collection portion 140 starts collecting the number of times of execution of each execution path in the outline structure graph. As another example, it is feasible to have the order of collecting the in-loop process frequencies predetermined between the in-outer loop structure graph and in-inner loop structure graph so that the in-loop process frequency collection portion 150 may collect the in-loop process frequencies in the predetermined order.

As a further example, in the case where a plurality of outer loop processes exist in the program, the in-loop process frequency collection portion 150 may start collecting the in-loop process frequencies for each depth of a hierarchy. For instance, in the case of starting collecting the in-loop process frequencies in one outer loop process, the in-loop process frequency collection portion 150 may start collecting the in-loop process frequencies in the other outer loop processes, and in the case of starting collecting the in-loop process frequencies in one inner loop process, it may start collecting the in-loop process frequencies in the other inner loop processes.

FIG. 3 shows an example of the program to be optimized. This to 14th lines. The method "m" has the outer loop process from the 4th to 12th lines. And the outer loop process has the inner loop process from the 6th to 10th lines. The sentence in the 9th line indicates the process for finishing the process of the method "m" in the case where the condition shown in the 8th line holds.

The sentence in the 3rd line, sentence in the 5th line, sentence in the 6th line, sentence in the 7th to 8th lines, sentence in the 9th line, sentence in the 11th to 12th lines, and sentence in the 13th line constitute the first to seven basic blocks respectively.

FIG. 4 shows an example of the control flow graph. On receiving the program shown in FIG. 3, the control flow graph generating portion 100 generates the control flow graph shown in FIG. 4. In FIG. 4, circles are the nodes indicating the instruction sequences of the program, and arrows are directed edges indicating the execution order of the instruction sequences. The instruction sequences in FIG. 4 are the basic blocks, and the numbers described in the nodes are node numbers for identifying the basic blocks shown in FIG. 3. By way of example, the directed edge from the third node to the fourth node and the sixth node indicates that the fourth or sixth basic block is executed after the third basic block.

FIG. 5(*a*) shows an example of the control flow graph for which the structure graphs will be generated. According to the control flow graph shown in FIG. 5(*a*), a header node 500 and a latch node 510 are sequentially executed after a pre-loop process is performed. Subsequently, the header node 500 or post-loop process is performed according to processing results of the latch node 510. To be more specific, the header node 500 and latch node 510 form the loop process.

FIG. 5(*b*) shows the execution paths of the control flow graph. The control flow graph shown in FIG. 5(*a*) has an execution path 520 for sequentially performing the header node 500 and latch node 510 from the pre-loop process without repeatedly performing them and moving on to the post-loop process, an execution path 530 for sequentially performing the header node 500 and latch node 510 from the pre-loop process and moving on to the repeated processing, an execution path 540 for having the latch node 510 further processed by the execution path from the latch node 510 to the header node 500, and an execution path 550 for sequentially performing the header node 500 and latch node 510 and then moving on to the post-loop process.

FIG. 5(*c*) shows the execution paths of the structure graph generated from the control flow graph. The structure graph generating portion 120 generates the outline structure graph and the in-loop structure graph. The in-loop structure graph has the execution path 530, execution path 540, execution path 550 and a control flow 560 from the header node 500 to the latch node 510. The outline structure graph has the execution path 520 from the pre-loop process through the loop process to the post-loop process. Thus, the structure graph generating portion 120 generates as the outline structure graph the graph in which the loop process in its entirety is generated as the single loop node in the control flow graph instead of the collection of the nodes forming the loop process. To be more specific, the execution path of the outline structure graph in FIG. 5(*c*) is the execution path 520. The structure graph generating portion 120 also generates the control flow graph of the collection of the nodes forming the loop process as the in-loop structure graph. To be more specific, the execution paths of the in-loop structure graph in FIG. 5(*c*) are the execution path 530, execution path 540, execution path 550 and a control flow 560.

To be more precise, the structure graph generating portion 120 performs the following process in order to generate the in-loop structure graph. The structure graph generating portion 120 generates as the in-loop structure graph the header node 500 which is an entry node for starting the loop process from outside the loop process and the latch node 510 which is an exit node for moving the process from the loop process to outside the loop process. And in the control flow graph, the structure graph generating portion 120 includes all the edges and nodes from the header node 500 to the latch node 510 in the in-loop structure graph. And the structure graph generating portion 120 generates the edge on the header node 500 from a dummy node indicating a starting point of the in-loop structure graph instead of the pre-loop process. The structure graph generating portion 120 also generates the edge to the dummy node indicating an ending point of the in-loop structure graph from the latch node 510 instead of the post-loop process.

FIG. 6(a) shows an example of the outline structure graph generated from the control flow graph shown in FIG. 4. The circles in a heavy line in FIG. 6(a) indicate the loop nodes generated instead of the loop process. For instance, the structure graph generating portion 120 generates the outline structure graph by the following process. In the control flow graph shown in FIG. 4, the structure graph generating portion 120 generates a second node which is an outer loop node showing the entire outer loop process instead of a set of nodes forming the outer loop process, that is, the second, third, fourth and sixth nodes.

Subsequently, the structure graph generating portion 120 generates the directed edge in a dotted line from the second node to the fifth and seventh nodes performed after the second node. Here, the directed edge in the dotted line does not really exist in the control flow graph shown in FIG. 4, but it indicates a virtual execution route implemented by a combination of a plurality of directed edges in the control flow graph. For instance, the directed edge from the second node to the fifth node indicates the execution route leading to the fifth node via the fourth node after the execution of the outer loop. The virtual nodes indicating the starting point and ending point of the outline structure graph are indicated as E1 and X1 respectively.

FIG. 6(b) shows an example of the in-outer loop structure graph generated from the control flow graph shown in FIG. 4. The structure graph generating portion 120 generates the in-outer loop structure graph by the following process. In the control flow graph of the outer loop process, the structure graph generating portion 120 generates the third node which is the inner loop node showing the entire inner loop process instead of a set of nodes constituting the inner loop process, that is, the third and fourth nodes.

And the structure graph generating portion 120 generates the directed edge in the dotted line from the starting point E2 of the in-outer loop structure graph to the second node which is an entrance to the outer loop process, the directed edge in the dotted line from the third node to the ending point X2 of the in-outer loop structure graph, and the directed edge in the dotted line from the sixth node to X2.

FIG. 6(c) shows an example of the in-inner loop structure graph generated from the control flow graph shown in FIG. 4. The structure graph generating portion 120 generates the in-inner loop structure graph by the following process. The structure graph generating portion 120 generates the control flow graph of the set of nodes constituting the inner loop process. And the structure graph generating portion 120 generates the directed edge in the dotted line from the starting point E3 of the in-inner loop structure graph to the third node which is the entrance to the inner loop process, the directed edge in the dotted line from the third node to the ending point X3 of the in-inner loop structure graph, and the directed edge in the dotted line from the fourth node to X3.

In the case where, unlike the example in FIG. 6(c), the program to be compiled is an irreducible graph, the structure graph generating portion 120 generates the directed edge for each of a plurality of nodes which may be the starting point of the loop process from the node showing the starting point of each structure graph.

The counter insertion portion 130 inserts the counter into the program in order to count the number of times of execution of each execution path in each of the structure graphs generated as above. An example of a counter position inserted by the counter insertion portion 130 is indicated by a black point. For instance, in the outline structure graph, the counter insertion portion 130 inserts the counters into the directed edge from the fourth node to the fifth node and the directed edge from the sixth node to the seventh node. In the in-outer loop structure graph, the counter insertion portion 130 inserts the counters into the directed edge from the first node to the second node, the directed edge from the fourth node to the fifth node, the directed edge from the sixth node to the second node and the directed edge from the sixth node to the seventh node. In the in-inner loop structure graph, the counter insertion portion 130 inserts the counters into the directed edge from the second node to the third node, the directed edge from the third node to the sixth node, and the directed edge from the fourth node to the fifth node.

The positions for inserting the counters are not limited to the examples in the drawing. For instance, the Non-Patent Document 1 has a proposal of a method for efficiently determining the number of times of execution of each execution path, and so the positions for inserting the counters may be determined by using the method. To be more specific, the counter insertion portion 130 inserts the counter at the position capable of counting the number of times of execution of each execution path in each structure graph. The counter insertion portion 130 may insert an initialization process for initializing the counter as required. In the case where a plurality of counters are inserted into the program, the counter insertion portion 130 may further insert into the program the process for changing the counter to be determined of the plurality of counters. For instance, in the case where the counter insertion portion 130 generates each of the plurality of counters as an array variable which is one counter, it may further insert into the program a process for changing a subscript of the array variable in order to change the counter to be determined. To be more specific, the counter insertion portion 130 inserts into the program the process for controlling the counters in order to count the number of times of execution of each execution path.

FIG. 7(a) shows an example wherein the counter inserted into the program is stopped. The counter insertion portion 130 inserts an NOP instruction 700 at an insertion position of the program for inserting the counter in order to count the number of times of execution of each execution path of the structure graphs. And the counter insertion portion 130 generates a determination process 710 for determining the number of times of execution. The counter insertion portion 130 generates a jump instruction for moving the process to the instruction executed immediately after the NOP instruction 700 at a portion executed at the end of the determination process 710.

To describe it further in detail, the counter insertion portion 130 inserts the NOP instruction 700 or a jump instruction 720 into the basic block of the program to be compiled. However, there are the cases where the NOP instruction 700 or jump instruction 720 cannot be inserted into an existing basic block depending on the execution path to be determined. In such cases, the counter insertion portion 130 may generate a new basic block, that is, the basic block for inserting an instruction to implement the counter such as the NOP instruction 700 or jump instruction 720.

FIG. 7(*b*) shows an example wherein the counter inserted into the program is started. The in-loop execution information generating portion 160 generates the jump instruction 720 for causing the process to jump to the determination process 710 instead of the NOP instruction 700. Thus, the in-loop execution information generating portion 160 can have the number of times of execution of the execution paths including the jump instruction 720 determined by the determination process 710.

FIG. 7(*c*) shows an example of generating a plurality of counters at the same insertion position. A description will be given by using FIG. 7(*c*) as to the process of the compiler apparatus 10 in the case where the insertion position in the program for inserting the counter in order to determine the number of times of execution of each execution path of the outline structure graph is the same as the position in the program for inserting the counter in order to determine the number of times of execution of each execution path of the in-loop structure graph, and the counter of one, at the most, of the outline structure graph and in-loop structure graph is started.

The counter insertion portion 130 generates a plurality of determination processes for determining the number of times of execution of each execution path in each of the outline structure graph and the in-loop structure graph. For instance, the counter insertion portion 130 generates the determination process 710 for determining the number of times of execution of each execution path of the outline structure graph and a determination process 730 for determining the number of times of execution of each execution path of the in-loop structure graph. Furthermore, the counter insertion portion 130 inserts the jump instruction for jumping to the instruction executed following the insertion position of the counter (the position of the jump instruction 720 for instance) at the position executed at the end of each of the determination process 710 and determination process 730.

The in-loop execution information generating portion 160 generates the jump instruction 720 for causing the process to jump to the determination process 710 at the insertion position of the counter so as to have the number of times of execution of each execution path of the outline structure graph determined. The in-loop execution information generating portion 160 also generates the jump instruction 720 for causing the process to jump to the determination process 730 at the insertion position of the counter so as to have the number of times of execution of each execution path of the in-loop structure graph determined. Thus, the counter insertion portion 130 sets the jump destination of the jump instruction at one of the plurality of determination processes so as to determine the number of times of execution of each execution path of both the outline structure graph and in-loop structure graph.

The compiler apparatus 10 operates approximately as shown in FIG. 7(*c*) as shown below, even in the case where the insertion position in the program for inserting the counter in order to determine the number of times of execution of each execution path of the in-outer loop structure graph is the same as the position in the program for inserting the counter in order to determine the number of times of execution of each execution path of the in-inner loop structure graph, and the counter of one, at the most, of the in-outer loop structure graph and in-inner loop structure graph is started.

To be more precise, the counter insertion portion 130 generates a plurality of determination processes for determining the number of times of execution of each execution path in each of the in-outer loop structure graph and in-inner loop structure graph. For instance, the counter insertion portion 130 generates the determination process 710 for determining the number of times of execution of each execution path of the in-outer loop structure graph and a determination process 730 for determining the number of times of execution of each execution path of the in-inner loop structure graph. Furthermore, the counter insertion portion 130 inserts the jump instruction for jumping to the instruction executed following the insertion position of the counter (the position of the jump instruction 720 for instance) at the position executed at the end of each of the determination process 710 and determination process 730.

The in-loop execution information generating portion 160 generates the jump instruction 720 for causing the process to jump to the determination process 710 at the insertion position of the counter so as to have the number of times of execution of each execution path of the in-outer loop structure graph determined. The in-loop execution information generating portion 160 also generates the jump instruction 720 for causing the process to jump to the determination process 730 at the insertion position of the counter so as to have the number of times of execution of each execution path of the in-inner loop structure graph determined. Thus, the counter insertion portion 130 sets the jump destination of the jump instruction at one of the plurality of determination processes so as to determine the number of times of execution of each execution path of both the in-outer loop structure graph and in-inner loop structure graph.

As described above, the counter insertion portion 130 can determine the number of times of execution of the execution paths of both the structure graphs at the insertion positions as shown in the drawing in the case where the counter of one, at the most, of the two structure graphs is started, that is, in the case where it is assured that the counters are not simultaneously used in both the structure graphs. In the case of three or more structure graphs, the compiler apparatus 10 can share the counter likewise when the counter of one structure graph is started at the most.

As for the two counters simultaneously used, the counter insertion portion 130 generates each of the two counters at the insertion position. For instance, in the case of starting to collect the in-loop process frequencies in the in-outer loop structure graph when the collection is started as to the number of times of execution of each execution path of the outline structure graph, the counter insertion portion 130 generates each of the counters of each of the outline structure graph and in-outer loop structure graph at the insertion position. Thus, the counter insertion portion 130 may change the method of inserting the counters according to the timing for collecting the in-loop process frequencies.

In the case where no exclusive control is exerted other than the determination process and a plurality of threads simultaneously perform the determination process, the value of the counter may become incorrect. However, in the case where the number of threads is sufficiently smaller than the determined value, an error in the determined value is so slight that the compiler apparatus 10 can almost exactly determine the number of times of execution of each execution path.

FIG. 8 shows an example of the execution information generated by the compiler apparatus 10. To describe it further in detail, FIG. 8 associates an identification number for identifying the execution path with a permutation of the nodes constituting the execution path, the determined value which is the number of times of execution of the execution path determined by the counter, the execution information (in-loop execution information, for instance) generated based on the determined value, and the number of times of actual execution so as to show it in each structure graph.

The loop process frequency collection portion 140 stops the counter for determining the number of times of execution of the execution path of the outline structure graph when having executed the program 100 times as predetermined. At this time, it sequentially executes from a node E1 to the first node, second node and seventh node, and the number of times of execution of the first execution path leading to the node X1 is determined as 100 times. To be more specific, the second execution path is not executed at all. In this case, the in-loop execution information generating portion 160 generates 100.0 as the execution information which is the frequency with which the first path is executed in the case where the program is executed 100 times.

Subsequently, in the case where the outer loop process frequency, that is, the frequency with which the second node is executed is higher than the predetermined frequency, the in-loop process frequency collection portion 150 collects the in-outer loop process frequencies. First, the in-loop process frequency collection portion 150 starts the counter for determining the number of times of execution of each of the plurality of execution paths in the in-outer loop structure graph, and stops it when the total of determined values of the plurality of execution paths becomes 100 times as predetermined. And the in-loop process frequency collection portion 150 collects the in-outer loop process frequencies which is the frequency with which each execution path is executed as against the number of times of execution of the outer loop process.

For instance, the number of times of execution of the outer loop process is the number of times of moving the process from an E2 node to the outer loop, and so it is 51 times as the total value from the third path to the fifth path. The number of times of execution of the eighth path is 48 times, for instance. To be more specific, the in-loop process frequency collection portion 150 collects the information indicating that the eighth execution path is executed 48 times in the case where the outer loop process is executed 51 times as the in-outer loop process frequency.

And the in-loop execution information generating portion 160 generates 94.1 which is the in-loop execution information on the outer loop process by multiplying 100.0 as the process frequency of the outer loop process by the in-outer loop process frequency, for instance, 48/51 as the process frequency of the eighth execution path for instance. The in-loop execution information generating portion 160 also generates the in-loop execution information from the third path to the seventh path by approximately the same method as with the eighth execution path, and so a description thereof will be omitted.

Subsequently, the loop process frequency collection portion 140 calculates the frequency with which the inner loop process frequency, that is, the third node is executed based on the in-loop execution information on the outer loop process. For instance, the loop process frequency collection portion 140 selects all the execution paths for executing the third node in the in-outer loop structure graph, that is, the third to eighth paths. And the loop process frequency collection portion 140 generates 196.1 which is the total value of the in-loop execution information in the selected paths as the inner loop process frequency.

Subsequently, in the case where the inner loop process frequency, that is, the frequency with which the third node is executed is higher than the predetermined frequency, the in-loop process frequency collection portion 150 collects the in-inner loop process frequencies by the following process.

The in-loop process frequency collection portion 150 starts the counter for determining the number of times of execution of each of the plurality of execution paths in the in-inner loop structure graph, and stops it when the total of determined values of the plurality of execution paths becomes 100 times as predetermined. And the in-loop process frequency collection portion 150 collects the in-inner loop process frequencies which is the frequency with which each execution path is executed as against the number of times of execution of the inner loop process.

For instance, the number of times of execution of the inner loop process is the number of times of moving the process from an E3 node to the inner loop, and so it is 58 times as the total value from the ninth path to the eleventh path. The number of times of execution of the thirteenth execution path is 40 times, for instance. To be more specific, the in-loop process frequency collection portion 150 collects the information indicating that the thirteenth execution path is executed 40 times in the case where the inner loop process is executed 58 times as the in-inner loop process frequency.

And the in-loop execution information generating portion 160 generates 135.2 which is the in-loop execution information on the inner loop process by multiplying 196.1 as the process frequency of the inner loop process by the in-inner loop process frequency, for instance, 40/58 as the process frequency of the thirteenth execution path for instance. The in-loop execution information generating portion 160 also generates the in-loop execution information from the ninth path to the twelfth path and fourteenth path by approximately the same method as with the thirteenth execution path, and so a description thereof will be omitted.

The method of generating the in-loop execution information described above will be indicated by a formula.

The in-loop execution information generating portion 160 generates the execution information on each execution path in a structure graph X by multiplying the determined value which is the number of times of execution of each execution path by a correction coefficient Cx shown by the following formula.

$$C_x = \begin{cases} thresholdCount(X) & \text{In the case where } X \text{ is the outline structure graph} \\ \dfrac{C_r \sum_{q \in P_Y(N_x)} C_q}{\sum_{q \in P_X(entry)} C_p} & \text{Otherwise} \end{cases} \quad \text{[Formula 1]}$$

Here, thresholdCount (X) is preset by associating it with the structure graph X, and shows the total value of the determined values collected in the structure graph X. Cp represents the determined value of the number of times of execution collected for a route p, Px (a) represents a collection of the routes running through a node a in the structure graph X, Px (entry) represents a collection of the routes entering the loop from outside it in the structure graph X, and Nx is a loop node in the structure graph of a high order hierarchy corresponding to the structure graph X respectively. Cy is the correction coefficient in the structure graph of the high order hierarchy of the structure graph X. Here, the high order hierarchy is the structure graph in a further outer loop process, for instance. For instance, the high order hierarchy of the in-inner loop structure graph is the in-outer loop structure graph, and the high order hierarchy of the in-outer loop structure graph is the outline structure graph.

This drawing further shows the number of times of actual execution of each execution path determined by another method by associating it to the execution information. The other method determines the number of times of execution of each execution path in the case of executing the program 10,000 times.

As opposed to this, the compiler apparatus 10 according to this embodiment can generate approximately the same execution information as the number of times of actual execution by determining the number of times of execution of the execution paths 100 times for each structure graph, that is, 300 times in total. Accordingly, the compiler apparatus 10 can reduce the time required for the compilation process.

FIG. 9($a$) shows the number of times of execution of each execution path determined by the outline structure graph. In the case where the program is executed 100 times, the first execution path leading to the node X1 from the node E1 by way of the first node, second node and seventh node is executed 100 times.

FIG. 9($b$) shows the number of times of execution of each execution path determined by the in-outer loop structure graph. In the case where the total of the number of times of execution of each execution path becomes 100 times, the fourth execution path leading to a node X2 from the node E2 by way of the second node, third node and sixth node is executed 50 times. The eighth execution path leading to the sixth node by way of the sixth node, second node and third node is executed 48 times.

FIG. 9($c$) shows the number of times of execution of each execution path determined by the in-inner loop structure graph. In the case where the total of the number of times of execution of each execution path becomes 100 times, the eleventh execution path leading to a node X3 from the node E3 by way of the third node is executed 56 times. The thirteen execution path leading to the fourth node by way of the fourth node and third node is executed 40 times.

FIG. 9($d$) shows an example of the in-loop execution information generated by the in-loop execution information generating portion 160. The in-loop execution information generating portion 160 generates 94.1 as the in-loop execution information indicating the frequency with which the eighth execution path is executed in the case where the program is executed 100 times. The in-loop execution information generating portion 160 also generates 98.0 as the in-loop execution information indicating the frequency with which the fourth execution path is executed in the case where the program is executed 100 times. The in-loop execution information generating portion 160 also generates 135.2 as the in-loop execution information indicating the frequency with which the thirteenth execution path is executed in the case where the program is executed 100 times. To be more specific, according to the compiler apparatus 10, the program to be compiled executes the fourth execution path for continuously executing the program from the starting point to the ending point without performing the loop process, the eighth execution path for repeating the outer loop process, and the thirteenth execution path for repeating the inner loop process more frequently than other execution paths.

FIG. 10($a$) shows an example wherein the program is optimized by the optimization portion 30. The optimization portion 30 optimizes each of the plurality of execution paths more frequently executed (hot paths) based on the in-loop execution information to place them in contiguous areas. For instance, the optimization portion 30 separates the outer loop process and inner loop process in order to efficiently optimize the fourth execution path for consecutively executing the first node, second node, third node, sixth node and seventh node. The optimization portion 30 separates the second node, third node, sixth node and seventh node shaded respectively from the control flow graph as the outer loop process. The optimization portion 30 performs loop peeling to the outer loop process so as to separate the third node and sixth node shaded respectively from the control flow graph as the inner loop process.

FIG. 10($b$) shows the results wherein the instruction sequences are placed in the program optimized by the optimization portion 30. The optimization portion 30 places the instruction sequences from the first node to the seventh node, from the second node to the seventh node, and from the fourth node to the sixth node in the contiguous areas respectively. Branching processes performed not to be contiguously placed are shown by arrows. The execution information in each branching process is added to the arrow. As shown in FIG. 10($b$), the optimization portion 30 can reduce the frequency with which the branching process is performed by the branch instruction. Thus, it is possible to improve efficiency of a branching forecast process by hardware. Furthermore, it improves a percent hit rate of a cache memory for instructions in a processor. It is also possible to decrease the number of redundant unconditional branches and redundant forward branches.

FIG. 11 shows the method of generating the execution information in a first other example. The compiler apparatus in this example does not create the structure graph but determines the execution frequency as to all the execution paths of the control flow graph. For instance, the compiler apparatus in this example inserts the counters at the positions of the black points in FIG. 11, that is, into each of the edge from the first node to the second node, the edge from the fourth node to the third node, the edge from the fourth node to the fifth node, the edge from the sixth node to the second node, and the edge from the sixth node to the seventh node so as to collect the determined value on each counter.

FIG. 12($a$) shows an example of the execution information collected in the first other example on the control flow graph. FIG. 12($b$) shows an example of the execution information collected in the first other example in a table. The compiler apparatus in this example stops the counter when having executed the program 300 times in order to reduce the time required for the compilation. As shown in the drawing, the compiler apparatus in this example can detect that the third execution path leading to the seventh node from the first node by way of the second node, third node and sixth node, and the sixth execution path leading to the third node from the fourth node by way of the third node and fourth node are the hot paths more frequently executed than other execution paths. However, the number of times of execution of the program is small, and so the compiler apparatus in this example cannot detect that the twelfth execution path leading to the second node from the sixth node by way of the second node, third node and sixth node is the hot path. Therefore, unlike the example in FIG. 10($b$), it cannot perform the optimization for consecutively placing the second node, third node, sixth node and seventh node.

As opposed to this, the compiler apparatus 10 according to this embodiment can detect that the twelfth execution path is the hot path while reducing the time required for the compilation as with the first other example.

FIG. 13 shows an example of the program optimized in a second other example. The compiler apparatus in this example collects the execution information of the program by an edge profile method of determining the number of times of processing each directed edge in the control flow graph. In this example, the execution path leading to the seventh node from the first node by way of the second node, third node and sixth node and the execution path leading to the fifth node from the fourth node are hot paths, and they are placed as consecutive instruction sequences respectively. However, it is not efficient because the forward branch instruction leading to the fourth node from the third node and the branch instruction leading to the third node from the fourth node are generated.

As opposed to this, according to FIG. 10(b), the program optimized by the compiler apparatus 10 has no forward branch instruction which is frequently executed, and so its execution efficiency is high.

FIG. 14 shows an example of hardware configuration of the compiler apparatus 10 according to the embodiment described above. The compiler apparatus 10 related to the embodiment or a deformation example is equipped with a CPU peripheral portion having a CPU 1000, an RAM 1020, a graphic controller 1075 and a display device 1080 mutually connected by a host controller 1082, an input-output portion having a communication interface 1030, a hard disk drive 1040 and a CD ROM drive 1060 connected to the host controller 1082 by an input-output controller 1084, and a legacy input-output portion having an ROM 1010, a flexible disk drive 1050 and an input-output chip 1070 connected to the input-output controller 1084.

The host controller 1082 connects the RAM 1020 to the CPU 1000 and graphic controller 1075 accessing the RAM 1020 at a high transfer rate. The CPU 1000 operates based on a compiler program and a runtime information generating program stored in the ROM 1010 and RAM 1020 so as to control each portion. The graphic controller 1075 obtains image data generated on a frame buffer provided in the RAM 1020 by the CPU 1000 and so on, and displays it on the display device 1080. Instead, the graphic controller 1075 may include therein the frame buffer for storing the image data generated by the CPU 1000 and so on.

The input-output controller 1084 connects the host controller 1082 to the communication interface 1030, hard disk drive 1040 and CD ROM drive 1060 which are relatively high-speed input-output devices. The communication interface 1030 communicates with other apparatuses via a network. The hard disk drive 1040 stores the compiler program or runtime information generating program and the data used by the compiler apparatus 10. The CD ROM drive 1060 reads the compiler program, runtime information generating program or the data from a CD-ROM 1095, and submits it to the input-output chip 1070 via the RAM 1020.

The input-output controller 1084 has the ROM 1010 and relatively low-speed input-output devices such as the flexible disk drive 1050 and input-output chip 1070 connected thereto. The ROM 1010 stores a boot program executed by the CPU 1000 on starting the compiler apparatus 10, the program dependent on the hardware of the compiler apparatus 10 and so on. The flexible disk drive 1050 reads the compiler program or runtime information generating program or the data from a flexible disk 1090, and provides it to the input-output chip 1070 via the RAM 1020. The input-output chip 1070 connects various input-output devices via the flexible disk 1090 and a parallel port, a serial port, a keyboard port, a mouse port and so on, for instance.

The compiler program or runtime information generating program provided to the compiler apparatus 10 is stored in a record medium such as the flexible disk 1090, CD-ROM 1095 or an IC card, and is provided to a user. The compiler program or runtime information generating program is read from the record medium, and is installed on the compiler apparatus 10 via the input-output chip 1070 so as to be executed on the compiler apparatus 10.

The compiler program or runtime information generating program to be installed and executed on the compiler apparatus 10 includes a control flow graph generation module, a loop detection module, a structure graph generation module, a counter insertion module, a loop process frequency collection module, an in-loop process frequency collection module, an in-loop execution information generating module and an optimization module. The operations performed by the compiler apparatus 10 being prompted by the modules are the same as the operations of corresponding members of the compiler apparatus 10 described by referring to FIGS. 1 to 13, and so a description thereof will be omitted.

The program or modules described above may be stored on an external storage medium. As for the storage medium, in addition to the flexible disk 1090 and CD-ROM 1095, an optical record medium such as a DVD or a PD, a magneto-optical record medium such as an MD, a tape medium or a semiconductor memory such as the IC card may be used. It is also feasible to use as the record medium a storage device such as a hard disk or an RAM provided on a server system connected to a dedicated communication network or the Internet so as to provide the compiler program or runtime information generating program to the compiler apparatus 10 via the network.

As is clear from the above description, the compiler apparatus 10 can collect the in-loop execution information at high speed and appropriately optimize the program. For instance, in the case where the compiler apparatus 10 is a runtime compiler, the program can be more efficiently optimized because the compilation cannot take so much time.

Although the present invention was described by using the embodiment above, the technical scope of the present invention is not limited to the scope of the above embodiment. It is possible to add various modifications and improvements to the above embodiment. It is clear from the description in claims that the embodiments having such modifications and improvements added thereto are included in the technical scope of the present invention.

According to the embodiment described above, the compiler apparatus, compiler program, record medium, compilation method, runtime information generating apparatus and runtime information generating program described in the articles are implemented.

(Article 1) A compiler apparatus for collecting the frequencies with which each process is executed in the program to be optimized and optimizing the above described program based on the collected frequencies, the above described apparatus having a loop process detection portion for detecting a repeatedly executed loop process of the above described program, a loop process frequency collection portion for collecting loop process frequencies with which the above described loop process is executed in the above described program, an in-loop process frequency collection portion for collecting in-loop process frequencies with which, as against the number of times of execution of the above described loop process, each of a plurality of in-loop processes included in the above described loop process is executed, an in-loop execution information generating portion for, based on the above described loop process frequencies and the above described in-loop process frequencies, generating in-loop execution information indicating the frequencies with which each of the above described plurality of in-loop processes is executed in the case where the above described program is executed, and an optimization portion for optimizing the above described program based on the above described in-loop execution information generated by the above described in-loop execution information generating portion.

(Article 2) The compiler apparatus according to article 1, wherein the above described in-loop process frequency collection portion collects the above described in-loop process frequencies in the case where the above described loop process frequencies are higher than a predetermined frequency.

(Article 3) The compiler apparatus according to article 1, wherein the above described in-loop execution information generating portion generates the above described in-loop execution information by multiplying the above described loop process frequencies by the above described in-loop process frequencies.

(Article 4) The compiler apparatus according to article 1, wherein the above described loop process is the outer loop process including the inner loop process which is a further inside loop process, the above described loop process detection portion further detects the above described inner loop process, the above described loop process frequency collection portion further collects the loop process frequencies with which the above described inner loop process is executed in the above described program based on the above described in-loop execution information, the above described in-loop process frequency collection portion collects the in-loop process frequencies of the above described inner loop process, and the above described in-loop execution information generating portion generates the in-loop execution information on the above described inner loop process by multiplying the in-loop process frequencies in the above described inner loop process by the above described loop process frequencies of the above described inner loop process.

(Article 5) The compiler apparatus according to article 1, wherein the above described loop process frequency collection portion stops the counter for determining the number of times of execution of the above described loop process when the above described program is executed a predetermined number of times so as to collect the number of times determined by the counter as the above described loop process frequencies, and the above described in-loop process frequency collection portion stops the counter for determining the number of times of execution of each of the above described plurality of in-loop processes when a total of determined values of the above described plurality of in-loop processes becomes the predetermined number of times.

(Article 6) The compiler apparatus according to article 1, further having the control flow graph generating portion for generating the control flow graph in which each of a plurality of instruction sequences in the above described program is generated as a node and an execution order of the above described plurality of instruction sequences is generated as the directed edge of the above described nodes, a structure graph generating portion for, in the above described control flow graph, generating an outline structure graph in which a single loop node for showing the above described loop process in its entirety is generated instead of the collection of the nodes forming the above described loop process and the in-loop structure graph which is the control flow graph of the collection of the nodes forming the above described loop process, and a counter insertion portion for, in each of the above described outline structure graph and the above described in-loop structure graph, inserting the counter into the above described program in order to count the number of times of execution of each execution path in the structure graphs, and wherein the above described loop process frequency collection portion generates as the above described loop process frequencies the numbers of times of execution of the above described loop node as against the numbers of times of execution of the above described program, and the above described in-loop process frequency collection portion collects as the above described in-loop process frequencies the number of times of execution of each execution path in the above described in-loop structure graph as against the numbers of times of execution of the above described loop process.

(Article 7) The compiler apparatus according to article 6, wherein in the case where the above described program is executed a predetermined number of times, the above described loop process frequency collection portion collects as the loop process frequencies the determined values of the counter inserted for counting the number of times of execution of the execution paths including the above described loop node, and in the case where a total of the determined values of the above described plurality of in-loop processes becomes a predetermined number of times, the above described in-loop process frequency collection portion collects the in-loop process frequencies based on the determined values of the counter inserted for counting the number of times of execution of each execution path in the above described in-loop structure graph.

(Article 8) The compiler apparatus according to article 6, wherein, in the case where the insertion position in the above described program for inserting the counter for determining the number of times of execution of each execution path in the above described outline structure graph is the same as the position in the above described program for inserting the counter for determining the number of times of execution of each execution path in the above described in-loop structure graph and then the counter of one, at the most, of the above described outline structure graph and the above described in-loop structure graph is started, the above described counter insertion portion inserts into the insertion position the counter for determining the numbers of times of execution of the execution paths in both the above described outline structure graph and the above described in-loop structure graph.

(Article 9) The compiler apparatus according to article 6, wherein, in the case where the insertion position in the above described program for inserting the counter for determining the number of times of execution of each execution path in the above described outline structure graph is the same as the position in the above described program for inserting the counter for determining the number of times of execution of each execution path in the above described in-loop structure graph and then the counter of one, at the most, of the above described outline structure graph and the above described in-loop structure graph is started, the above described counter insertion portion generates a plurality of determination processes for determining the number of times of execution of each execution path in each of the above described outline structure graph and the above described in-loop structure graph, and the above described in-loop process frequency collection portion inserts a jump instruction for moving the process to another portion into the above described insertion position and sets the jump destination of the jump instruction at one of the above described plurality of determination processes so as to determine the numbers of times of execution of the execution paths in both the above described outline structure graph and the above described in-loop structure graph.

(Article 10) The compiler apparatus according to article 6, wherein the above described loop process is the outer loop process including an inner loop process which is a further inside loop process, the above described loop process detection portion further detects the above described inner loop process, in the control flow graph of the above described outer loop process, the above described structure graph generating portion generates as an in-outer loop structure graph a graph in which the single inner loop node is generated instead of the collection of the nodes forming the above described inner loop process and generates the in-inner loop structure graph which is the control flow graph of the collection of the nodes forming the above described inner loop process, and the above described counter insertion portion further inserts the counter for determining the number of times of execution of each execution path in the above described in-inner loop structure graph, the above described loop process frequency collection portion further collects the loop process frequencies with which the above described inner loop process is executed in the above described program based on the above described in-loop execution information, the above described in-loop process frequency collection portion collects the frequencies of execution of each execution path in the above described in-inner loop structure graph as the in-loop process frequencies of the above described inner loop process as against the number of times of execution of the above described inner loop process, and the above described in-loop execution information generating portion further generates the in-loop execution information on the above described inner loop process by multiplying the in-loop process frequencies in the above described inner loop process by the loop process frequencies of the above described inner loop process.

(Article 11) The compiler apparatus according to article 10, wherein, in the case where the insertion position in the above described program for inserting the counter for determining the number of times of execution of each execution path in the above described in-outer loop structure graph is the same as the position in the above described program for inserting the counter for determining the number of times of execution of each execution path in the above described in-inner loop structure graph and then the counter of one, at the most, of the above described in-outer loop structure graph and the above described in-inner loop structure graph is started, the above described counter insertion portion inserts into the insertion position the counter for determining the numbers of times of execution of the execution paths in both the above described in-outer loop structure graph and the above described in-inner loop structure graph.

(Article 12) The compiler apparatus according to article 10, wherein in the case where the insertion position in the above described program for inserting the counter for determining the number of times of execution of each execution path in the above described in-outer loop structure graph is the same as the position in the above described program for inserting the counter for determining the number of times of execution of each execution path in the above described in-inner loop structure graph and then the counter of one, at the most, of the above described in-outer loop structure graph and the above described in-inner loop structure graph is started, the above described counter insertion portion generates a plurality of determination processes for determining the number of times of execution of each execution path in each of the above described in-outer loop structure graph and the above described in-inner loop structure graph, and the above described in-loop process frequency collection portion inserts the jump instruction for moving the process to another portion into the above described insertion position and sets the jump destination of the jump instruction at one of the above described plurality of determination processes so as to determine the number of times of execution of the execution paths in both the above described in-outer loop structure graph and the above described in-inner loop structure graph.

(Article 13) A compiler program for causing a computer to function as a compiler apparatus for collecting the frequencies with which each process is executed in the program to be optimized and optimizing the above described program based on the collected frequencies, the above described program causing the above described computer to function as the loop process detection portion for detecting the repeatedly executed loop process of the above described program, a loop process frequency collection portion for collecting the loop process frequencies with which the above described loop process is executed in the above described program, an in-loop process frequency collection portion for collecting in-loop process frequencies with which, as against the number of times of execution of the above described loop process, each of the plurality of in-loop processes included in the above described loop process is executed; the in-loop execution information generating portion for, based on the above described loop process frequencies and the above described in-loop process frequencies, generating the in-loop execution information indicating the frequencies with which each of the above described plurality of in-loop processes is executed in the case where the above described program is executed, and the optimization portion for optimizing the above described program based on the above described in-loop execution information generated by the above described in-loop execution information generating portion.

(Article 14) The record medium having the compiler program according to article 13 recorded thereon.

(Article 15) A compilation method for collecting frequencies with which each process is executed in the program to be optimized and optimizing the above described program based on the collected frequencies, the above described method having the loop process detection step of detecting the repeatedly executed loop process of the above described program, a loop process frequency collection step of collecting the loop process frequencies with which the above described loop process is executed in the above described program, an in-loop process frequency collection step of collecting the in-loop process frequencies with which, as against the number of times of execution of the above described loop process, each of a plurality of in-loop processes included in the above described loop process is executed, an in-loop execution information generating step of, based on the above described loop process frequencies and the above described in-loop process frequencies, generating the in-loop execution information indicating the frequencies with which each of the above described plurality of in-loop processes is executed in the case where the above described program is executed, and an optimization step of optimizing the above described program based on the above described in-loop execution information generated by the above described in-loop execution information generating portion.

(Article 16) A runtime information generating apparatus for collecting the frequencies with which each process is executed in the program to be optimized, the above described apparatus having the loop process detection portion for detecting the repeatedly executed loop process of the above described program, a loop process frequency collection portion for collecting the loop process frequencies with which the above described loop process is executed in the above described program, an in-loop process frequency collection portion for collecting the in-loop process frequencies with which, as against the number of times of execution of the above described loop process, each of a plurality of in-loop processes included in the above described loop process is executed, the in-loop execution information generating portion for, based on the above described loop process frequencies and the above described in-loop process frequencies, generating the in-loop execution information indicating the frequencies with which each of the above described plurality of in-loop processes is executed in the case where the above described program is executed, and optimizing the above described program based on the above described in-loop execution information generated by the above described in-loop execution information generating portion.

(Article 17) A runtime information generating program for causing a computer to function as the runtime information generating apparatus for collecting the frequencies with which each process is executed in the program to be optimized, the above described program causing the above described computer to function as a loop process detection portion for detecting a repeatedly executed loop process of the above described program, a loop process frequency collection portion for collecting the loop process frequencies with which the above described loop process is executed in the above described program, an in-loop process frequency collection portion for collecting the in-loop process frequencies with which, as against the number of times of execution of the above described loop process, each of the plurality of in-loop processes included in the above described loop process is executed, and an in-loop execution information generating portion for, based on the above described loop process frequencies and the above described in-loop process frequencies, generating the in-loop execution information indicating the frequencies with which each of the above described plurality of in-loop processes is executed in the case where the above described program is executed, and causing the above described program to be optimized based on the above described in-loop execution information generated by the above described in-loop execution information generating portion.

(Article 18) The record medium having the runtime information generating program according to article 17 recorded thereon.

Advantages of the Invention

As is clear from the above description, it is possible, according to the present invention, to collect the frequencies with which the processes of the program are executed at high speed.

Variations described for the present invention can be realized in any combination desirable for each particular application.

Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A compilation method for collecting frequencies with which each process is executed in a program to be optimized and optimizing said program based on the collected frequencies, said method having:
    a loop process detection step of detecting a repeatedly executed loop process of said program;
    a loop process frequency collection step of collecting loop process frequencies with which said loop process is executed in said program;
    an in-loop process frequency collection step of collecting in-loop process frequencies with which, as against the number of times of execution of said loop process, each of a plurality of in-loop processes included in said loop process is executed;
    an in-loop execution information generating step of, based on said loop process frequencies and said in-loop process frequencies, generating in-loop execution information indicating the frequencies with which each of said plurality of in-loop processes is executed in the case where said program is executed; and
    an optimization step of optimizing said program based on said in-loop execution information generated by said in-loop execution information generating portion,
    the in-loop executing information generating step further determining whether said loop process frequencies are higher than a predetermined reference frequency, and determining number of times of execution of said each of a plurality of in-loop processes.

2. A runtime information generating method comprising:
    collecting frequencies with which each process is executed in a program to be optimized, said step of collecting frequencies comprising:
    detecting a repeatedly executed loop process of said program;
    collecting loop process frequencies with which said loop process is executed in said program;
    collecting in-loop process frequencies with which, as against the number of times of execution of said loop process, each of a plurality of in-loop processes included in said loop process is executed;
    based on said loop process frequencies and said in-loop process frequencies, generating in-loop execution information indicating the frequencies with which each of said plurality of in-loop processes is executed in the case where said program is executed, and optimizing said program based on said in-loop execution information generated by said in-loop execution information generating portion,
    said generating further determining whether said loop process frequencies are higher than a predetermined reference frequency, and determining number of times of execution of said each of a plurality of in-loop processes if said loop process frequencies are higher than a predetermined reference frequency.

* * * * *